United States Patent [19]

Lew

[11] 4,336,558
[45] Jun. 22, 1982

[54] IMAGING SYSTEM AND METHOD WITH REDUCED MOIRE INTERFERENCE

[75] Inventor: Yung Lew, Huntington Beach, Calif.

[73] Assignee: American Hoechst Corp., Somerville, N.J.

[21] Appl. No.: 142,884

[22] Filed: Apr. 23, 1980

[51] Int. Cl.³ .................. H04N 1/04; H04N 7/12; H04N 1/36

[52] U.S. Cl. .................. 358/285; 358/138; 358/265; 358/293; 358/283

[58] Field of Search ............ 358/138, 260, 283, 264, 358/265, 266, 267, 293, 294, 285, 298

[56] References Cited

U.S. PATENT DOCUMENTS

| | | | |
|---|---|---|---|
| 3,816,659 | 6/1974 | Landsman | 358/264 |
| 3,898,083 | 11/1974 | Townsend | 358/260 |
| 4,068,265 | 1/1978 | Russell | 358/138 |
| 4,081,842 | 3/1978 | Harbaugh et al. | 358/264 |
| 4,131,916 | 12/1978 | Landsman | 358/264 |

Primary Examiner—John C. Martin
Assistant Examiner—Edward L. Coles
Attorney, Agent, or Firm—Flehr, Hohbach, Test, Albritton & Herbert

[57] ABSTRACT

System and method for forming a halftone image by scanning without visible moire interference. Alternate scan lines are sampled with clock signals of different phases to produce a displacement between adjacent scan lines in the output image. This displacement reduces the increase in spot width which would otherwise produce moire interference, with no increase in the rate at which the video signal is sampled.

6 Claims, 5 Drawing Figures

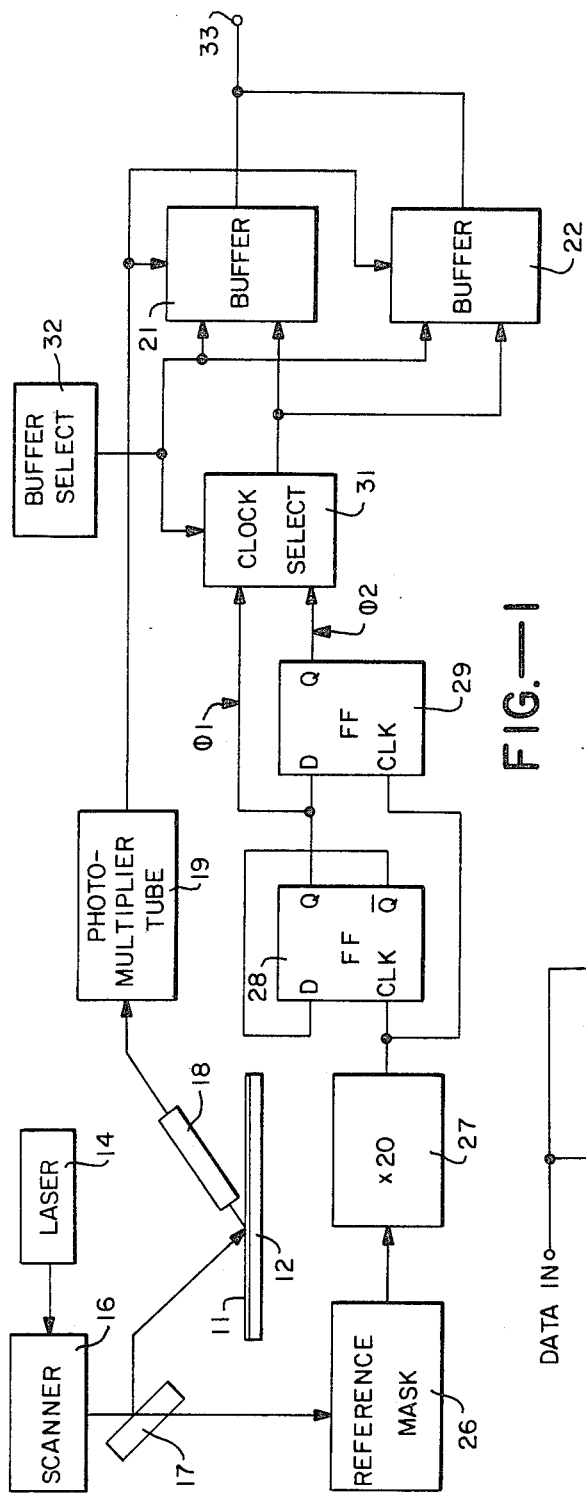
FIG.—1
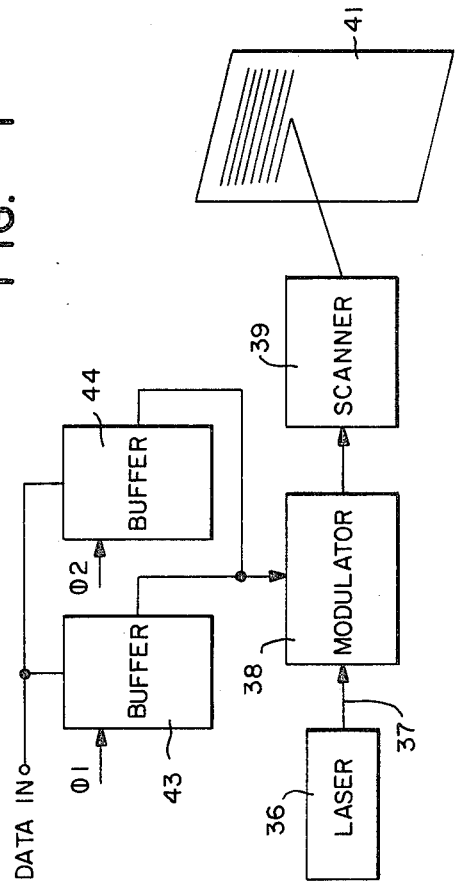
FIG.—2

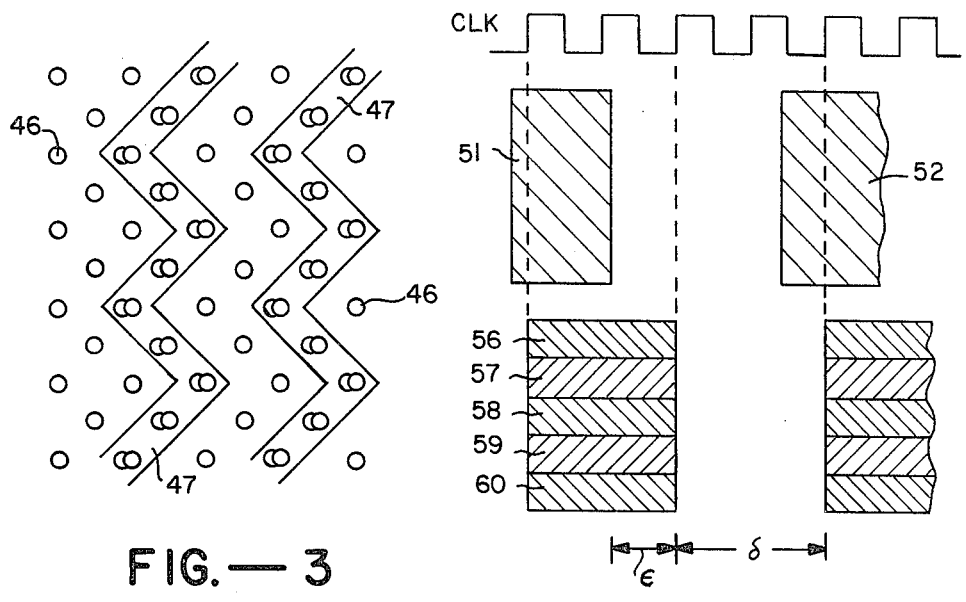
FIG.—3
FIG.—4
(PRIOR ART)
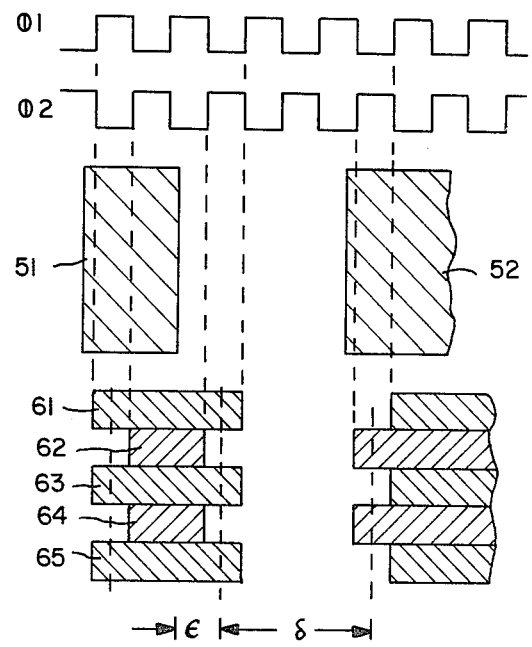
FIG.—5

IMAGING SYSTEM AND METHOD WITH REDUCED MOIRE INTERFERENCE

BACKGROUND OF THE INVENTION

This invention pertains generally to the formation of images by scanning, as in a laser engraving system, and more particularly to a system and method for eliminating moire interference in the formation of halftone images.

In recent years, laser engraving systems have been employed in the production of plates for the printing of newspapers and the like. In such systems, all or any part of the copy to be printed can be input by scanning from a copyboard, or it can be input through a computer or another suitable source. The information which is input is either stored or used immediately to control the modulation of a laser beam which scans the output medium to form the desired image.

When a halftone image is scanned, the resulting video signal has a frequency spectrum which is concentrated near one central frequency. If the video signal is sampled at a constant rate, one or more beat frequencies are generated between the video signal and the sampling frequency. These beat frequencies can produce interference in the form of wavy patterns, commonly known as moire patterns, which are visible to the eye in the output image.

There have been attempts to eliminate the moire interference from halftone images by increasing the sampling frequency so that the magnitude of the disturbances produced by the beat frequencies will be small and therefore not visible in the output image. While this technique may work satisfactorily in some instances, it is not always desirable to increase the sampling frequency, since a higher sampling frequency may either require a longer time to transmit an image or result in a higher signal-to-noise ratio in transmission in the sampling frequency and with use of same as the transmission frequency bandwidth.

OBJECTS AND SUMMARY OF THE INVENTION

It is in general an object of the invention to produce a new and improved system and method for reducing moire interference in the scanning of halftone images.

Another object of the invention is to provide a system and method of the above character in which the moire interference is eliminated without increasing the rate at which the video signal is sampled.

These and other objects are achieved in accordance with the invention by scanning the object along a successive scan lines to provide a video signal representative of the object, providing first and second clock signals which are equal in rate and displaced in phase from each other, and sampling the video signal for alternate ones of the scan lines in accordance with respective ones of the clock signals to provide output signals which are displaced in phase for adjacent scan lines. A writing beam scans along successive lines on an output medium, and for alternate lines is modulated in accordance with alternate ones of the output signals to form an image of the object in which adjacent scan lines are displaced from each other in accordance with the phase displacement of the clock signals.

BRIEF DESCRIPTION OF THE DRAWINGS

FIG. 1 is a block diagram of a first portion of a laser engraving system incorporating the invention.

FIG. 2 is a block diagram of the second portion of the laser engraving system of FIG. 1.

FIG. 3 is a schematic diagram illustrating the effect of moire interference in a halftone image.

FIG. 4 is a graphical representation illustrating the formation of a halftone image without the invention.

FIG. 5 is a graphical representation illustrating the formation of a halftone image in accordance with the invention.

DETAILED DESCRIPTION

In the drawings, the invention is illustrated in connection with a laser engraving system of the facsimilie type which is described in detail in U.S. Pat. No. 4,081,842. In this system, a paste-up or other suitable input copy 11 is mounted on a copyboard 12 and scanned in raster fashion by a reading beam 13 generated by a laser 14. A scanner 16 deflects the beam for scanning along successive lines on the input copy, and a beam splitter 17 directs the major portion of the reading beam from the scanner to the copy.

A fiber optic array 18 is positioned for receiving light from the reading beam reflected by the input copy. The fiber optic array has a plurality of fiber optic strands which are arranged in a line at one end parallel to the scan lines on the copy. The other ends of the strands are drawn together, and the array functions as a line-to-spot converter. Light gathered by the fiber optic array is detected by a photomultiplier tube 19 to provide a video signal corresponding to the information read from the input copy. This signal is sampled at a predetermined rate and stored in data buffers 21, 22 during alternate scan lines, as discussed more fully hereinafter.

Means is provided for generating two clock signals of equal pulse rate and opposite phases for sampling the video signal from the photomultiplier tube. This means includes a reference mask 26 which receives a portion of the reading beam from beam splitter 17. This mask includes an alternating array of bars which are opaque and transparent to the reading beam. As the reading beam scans across the input copy, the reference mask provides a reference clock signal corresponding to the position of the beam. In the embodiment illustrated, each of the opaque and transparent bars is 10 mils wide, and each of the pulses produced by the reference mask corresponds to a scan length of 10 mils on the input copy. The reference mask pulses are applied to a pulse rate multiplier 27, which in the embodiment illustrated multiplies the pulse rate by a factor of 20 so that each output pulse from the pulse rate multiplier corresponds to a scan length of 0.5 mil on the input copy.

The output of pulse rate multiplier 27 is connected to the clock input of D-type flip-flop 28. The $\overline{Q}$ output of this flip-flop is connected to the D input, and the flip-flop functions as a toggle flip-flop, which divides the pulse rate by a factor of 2 to provide a first clock signal $\Phi 1$ having a width corresponding to 1 mil on the input copy.

The output of width rate multiplier 27 is also connected to the clock input of a second D-type flip-flop 29, and the $\Phi 1$ clock signal is applied to the D input of this flip-flop. The output of flip-flop 29 is a second clock signal $\Phi 2$ which has the same pulse rate as the first clock signal but is displaced in phase by 180° from the first clock signal.

Means is provided for applying respective ones of the clock signals to data buffers 21, 22 during alternate scan lines. This means includes a clock selection network 31 to which the clock signals are applied. This network is controlled by a buffer selector 32 which delivers enabling signals to alternate ones of the buffers during successive scan lines. Thus, during one scan line, the video signal is read into buffer 21 in accordance with clock signal Φ1, and during the next scan line the video signal is read into buffer 22 in accordance with clock signal Φ2. The data is read out of the buffers in accordance with the respective clock signals and delivered to an output terminal 33 for transmission to a receiving station.

At the receiving station, the system includes a laser 36 which generates a writing beam 37. This beam passes through an acousto-optical modulator 38 to a scanner 39 which deflects the beam in raster fashion along successive lines on a printing plate or other suitable output medium 41. In modulator 38, the writing beam is modulated in accordance with data from buffers 43, 44 for successive lines of the output image. The data is read out of these buffers in accordance with clock signals Φ1, Φ2 which are generated by means of a reference mask, pulse rate multiplier, and flip-flops similar to elements 26-29 in FIG. 1.

Operation and use of the system, and therein the method of the invention, is best understood with reference to FIGS. 3-5. FIG. 3 illustrates the manner in which moire interference can arise in the scanning of a halftone image. The image consists of an array of dots 46 which are dark for a positive image. Beating between the video frequencies and the scanning frequencies can cause an enlargement of some of the dots, resulting in dark wavy lines 47, (moire patterns) in the output image.

FIG. 4 illustrates the manner in which variations in the width and spacing of the dots can arise in a prior art system in which a single clock signal CLK is utilized to sample the video signal during successive scan lines. In this example, two dark areas 51, 52 are scanned, and five scan lines 56-60 in the output image are illustrated. The clock pulses are assumed to correspond to a sample size of 1 mil, and the writing beam is turned on in response to positive going transistions in the clock signal. Once turned on, the writing beam remains on until the next positive transistion in the clock signal. Since the boundaries of the dark areas occur in random positions relative to the clock pulses, in the output image, the boundaries will be displaced by a distance ε which varies from 0 to 1 mil depending upon when the particular boundary happens to occur. The distance δ between adjacent boundaries can likewise vary up to 1 mil along the scan line. As illustrated in FIG. 4, these boundary errors can result in a noticable widening of the dark areas in the output image, resulting in moire interference.

In FIG. 5, the same dark areas 51, 52 are scanned, and portions of five scan lines 61-65 in the output image are illustrated. As discussed above, each of the pulses in clock signals Φ1, Φ2 corresponds to a sample size of 1 mil, and these clock signals are displaced in phase by 180°. In this example, the video signal is sampled in accordance with clock signal Φ1 during the odd numbered scan lines, and it is sampled in accordance with clock signal Φ2 during the even numbered lines. This causes the even numbered lines to be shifted 0.5 mil relative to the odd numbered lines. Within each scan line, the maximum boundary error ε is still 1 mil, and the maximum variation in the distance δ between the boundaries is likewise 1 mil. However, because of the 0.5 mil shift between adjacent scan lines, the maximum average boundary error for two scan adjacent lines is reduced to 0.75 mil, and the maximum variation in the distance between the boundaries is only 0.5 mil. Thus, the undesirable increase in spot width which gives rise to moire interference is substantially reduced, and the moire patterns are effectively elminiated from the output image. Significantly, this elimination of moire interference is achieved without any increase in the rate at which the video signal is sampled.

It is apparent from the foregoing that a new and improved system and method for forming halftone images without moire interference have been provided. While only certain presently preferred embodiments have been described in detail, as will be apparent to those familiar with the art, certain changes can be made without departing from the scope of the invention as defined by the following claims.

I claim:

1. In a method of forming an image of an object on an output medium, the steps of: scanning the object along successive scan lines to provide a video signal representative of the object, scanning a reference mask concurrently with the object to provide a reference signal corresponding to the position of the scan, providing first and second clock signals in response to the reference signal, said clock signals being equal in rate and displaced from each other in phase, sampling the video signal for alternate ones of the scan lines in accordance with respective ones of the clock signals to provide output signals which are displaced in phase for adjacent ones of the scan lines, scanning a writing beam along successive lines on the output medium, and modulating the writing beam for alternate lines in accordance with respective ones of the output signals to form an image of the object on the output medium in which adjacent ones of the lines forming the image are displaced from each other in accordance with the phase displacement of the clock signals.

2. The method of claim 1 wherein the output signals are stored and read out in accordance with the respective clock signals.

3. The method of claim 1 wherein the clock signals are displaced in phase by 180°.

4. In a system for forming an image of an object on an output medium: means for scanning the object along successive scan lines to provide a video signal representative of the object, a reference mask which is scanned concurrently with the object to provide a reference signal corresponding to the position of the scan, means responsive to the reference signal for providing first and second clock signals equal in rate and displaced from each other in phase, means for sampling the video signal for alternate ones of the scan lines in accordance with respective ones of the clock signals to provide output signals which are displaced in phase for adjacent ones of the scan lines, means for scanning a writing beam along successive lines on the output medium, and means for modulating the writing beam for alternate lines in accordance with respective ones of the output signals to form an image on the output medium in which adjacent ones of the lines forming the image are displaced from each other in accordance with the phase displacement of the clock signals.

5. The system of claim 4 further including means for storing the output signals, and means for reading the output signals for alternate lines out of the storage means in accordance with respective ones of the clock signals.

6. The system of claim 4 wherein the output medium is a printing plate, and the writing beam is a laser beam.

* * * * *